(12) United States Patent
Müller

(10) Patent No.: US 6,575,730 B2
(45) Date of Patent: Jun. 10, 2003

(54) ARRANGEMENT FOR A TWO-STAGE EJECTOR IN A MOULDING TOOL

(75) Inventor: Hans Müller, Pejlingsvägen 6, SE-506 70 Frufällan (SE)

(73) Assignee: Hans Müller (SE)

( * ) Notice: Subject to any disclaimer, the term of this patent is extended or adjusted under 35 U.S.C. 154(b) by 57 days.

(21) Appl. No.: 09/872,952

(22) Filed: Jun. 1, 2001

(65) Prior Publication Data

US 2002/0142063 A1 Oct. 3, 2002

(30) Foreign Application Priority Data

Mar. 28, 2001 (SE) .............................................. 0101103

(51) Int. Cl.[7] .............................................. B29C 45/40
(52) U.S. Cl. ........................................ 425/556; 264/334
(58) Field of Search ........................... 264/334; 425/556, 425/444, 436 R

(56) References Cited

U.S. PATENT DOCUMENTS 5,253,997 A * 10/1993 Kamada ..................... 425/556
5,833,912 A * 11/1998 Schweigert et al. ......... 425/556
6,164,955 A * 12/2000 Kubota ....................... 425/556
6,238,202 B1 * 5/2001 Joseph ........................ 425/556
6,435,857 B1 * 8/2002 Mitteregger et al. ........ 425/556

* cited by examiner

*Primary Examiner*—Tim Heitbrink
(74) *Attorney, Agent, or Firm*—Orum & Roth

(57) ABSTRACT

A two-stage ejector (2) in a molding tool (3), comprising an actuator part (7) exhibiting connecting segments (5) capable of radial displacement (4) and an attaching part (6) capable of detachable attachment to the actuator part (7). The attaching part is a telescopic tube (8) for determining the length of stroke attached to the inside (50A) of a front part (50) of the tool. The connecting tube (8) exhibits pairs of slots (10, 11) along its length. An attachment part (13) capable of being attached to a moving from ejector plate (12) is accommodated in the slots (10, 11) and is capable of displacement in the longitudinal extent (A) of the slots. A moving rear ejector plate (9) is attached to the actuating part (7), and the actuating part (7) is capable of displacement in a hole (17) passing through the tool frame (16), in the interior of which the rear part (18) of the actuating part is accommodated within the side (19) of the frame (16) facing away from the ejector plates.

10 Claims, 4 Drawing Sheets

ARRANGEMENT FOR A TWO-STAGE EJECTOR IN A MOULDING TOOL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION BY-REFERENCE OF MATERIAL SUBMITTED ON A COMPACT DISC

Not Applicable

BACKGROUND OF THE INVENTION

1. Field of the Invention

The present invention relates to an arrangement for a two-stage ejector in a moulding tool, which comprises an actuator part exhibiting connecting segments capable of being caused to be displaced radially and an attaching part capable of detachable connection to the aforementioned actuator part.

2. Description of Related Art

The most common two-stage ejectors manufactured until now are designed in such a way that, after installation in the moulding tool, they project to at least one side along the lower clamping plate in an intended moulding tool; see, for example, SE 510 134 C2. Many users of ejectors impose a requirement to the effect that no components that are included in the tool may project beyond the actual frame of the tool in order to ensure that the tool is able, without difficulty, to be handled on a workbench and/or, after handling, to be moved to a shelf stand or a pallet and placed level thereon.

BRIEF SUMMARY OF THE INVENTION

The principal object of the present invention is thus, in the first instance, to solve the aforementioned problem effectively and reliably by simple means.

The aforementioned object is achieved by means of an arrangement in accordance with the present invention, which is characterized essentially in that the attaching part is in the form of a telescopic tube for determining the length of stroke attached to the inside of a front part of the tool, in that the aforementioned attaching tube exhibits pairs of slots along its length, in that an attachment part capable of being attached to a moving front mould plate is accommodated in the aforementioned slots and is capable of displacement in the longitudinal extent of the slots, in that a moving rear mould plate is attached to the actuating part, and in that the aforementioned actuating part is movably accommodated in a hole passing entirely through the frame of the tool, and in the interior of which the rear part of the aforementioned actuating part is accommodated in its entirety within the side of the tool frame facing away from the mould plates.

The invention is described below as a preferred illustrative embodiment, in conjunction with which reference is made to the accompanying drawings, in which:

DETAILED DESCRIPTION OF THE INVENTION

Figure 1:
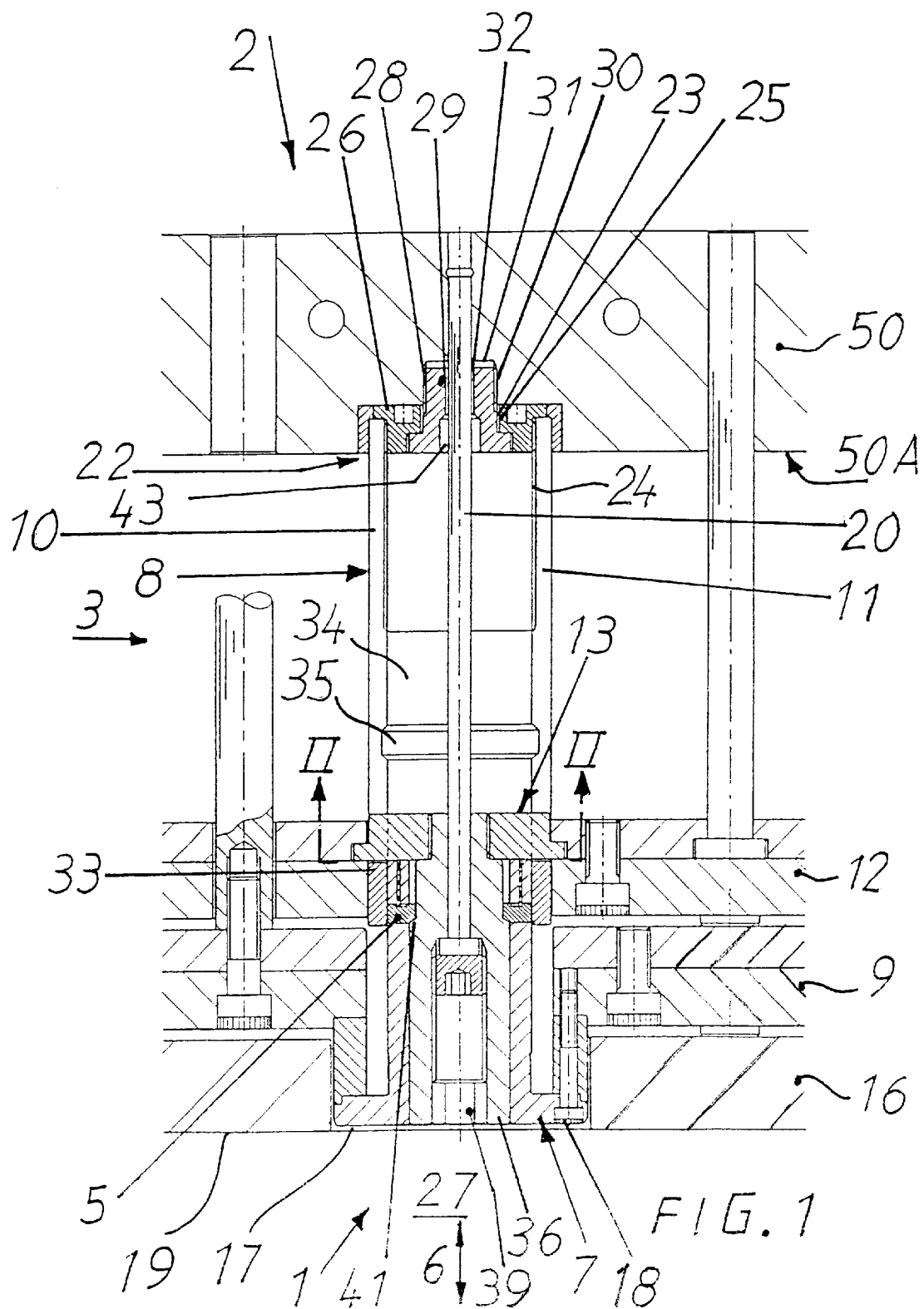
FIG. 1 shows a sectioned view of a moulding tool, such as a plastic moulding tool, namely an injection moulding tool, with a moving upper ejector plate situated at a distance from a fixed tool frame and with interjacent moving ejector plates in a retracted position.
Figure 2:
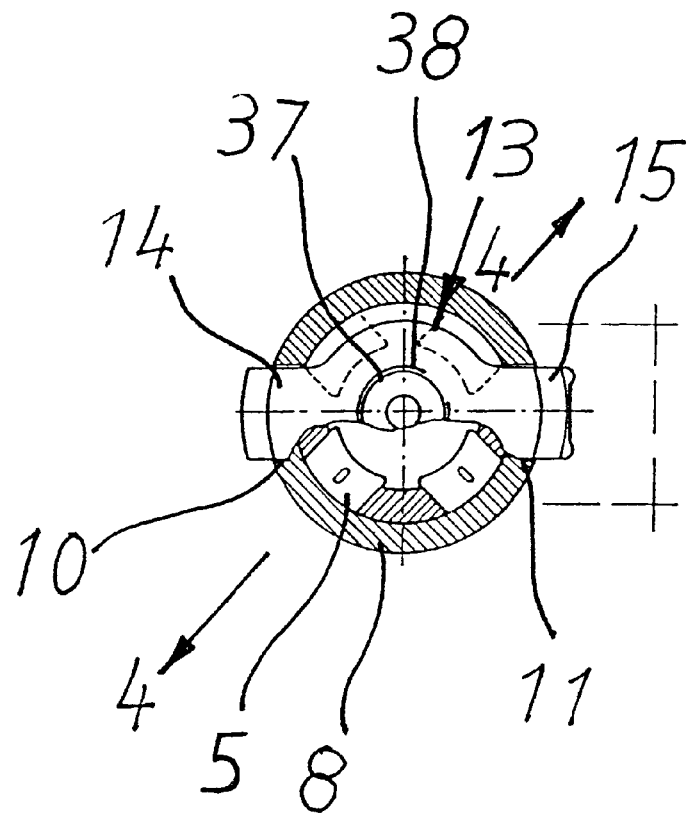
FIG. 2 shows a sectioned view, seen along the line II—II in FIG. 1.
Figure 3:
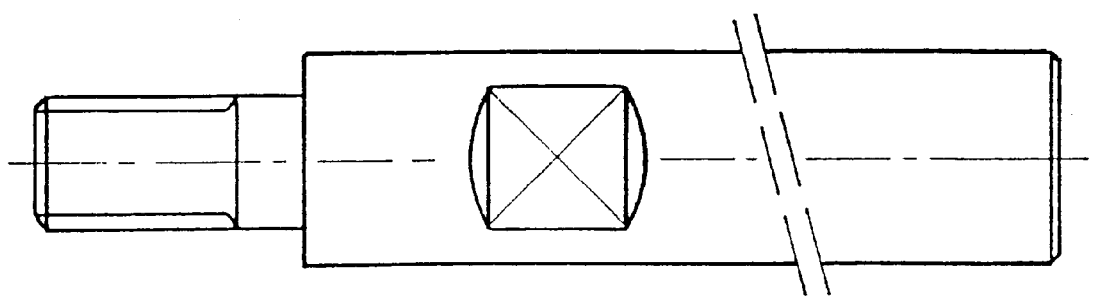
FIG. 3 shows a loose connection part.
Figure 4:
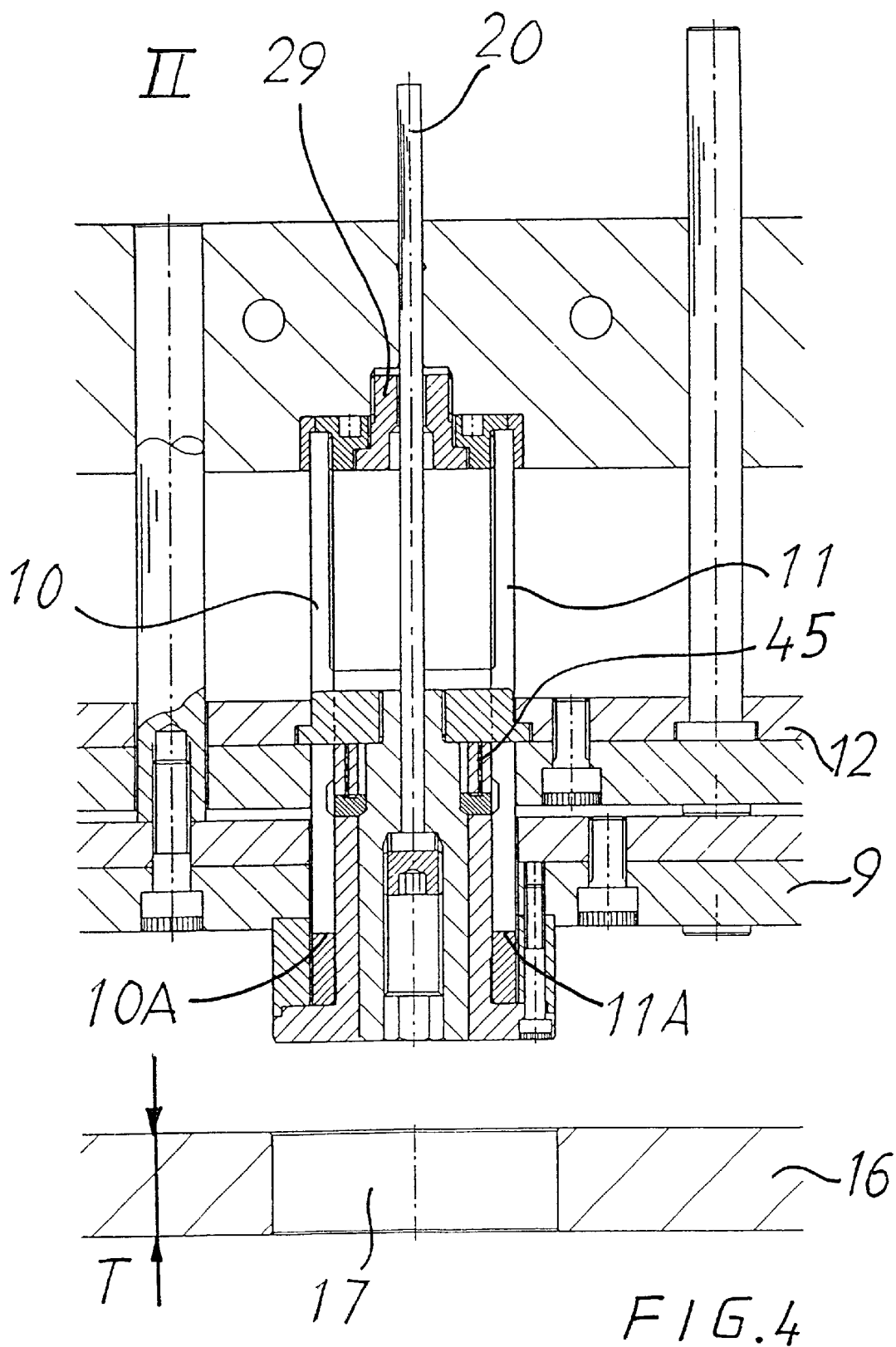
FIG. 4 shows the two moving ejector plates displaced to a first extended position.
Figure 5:
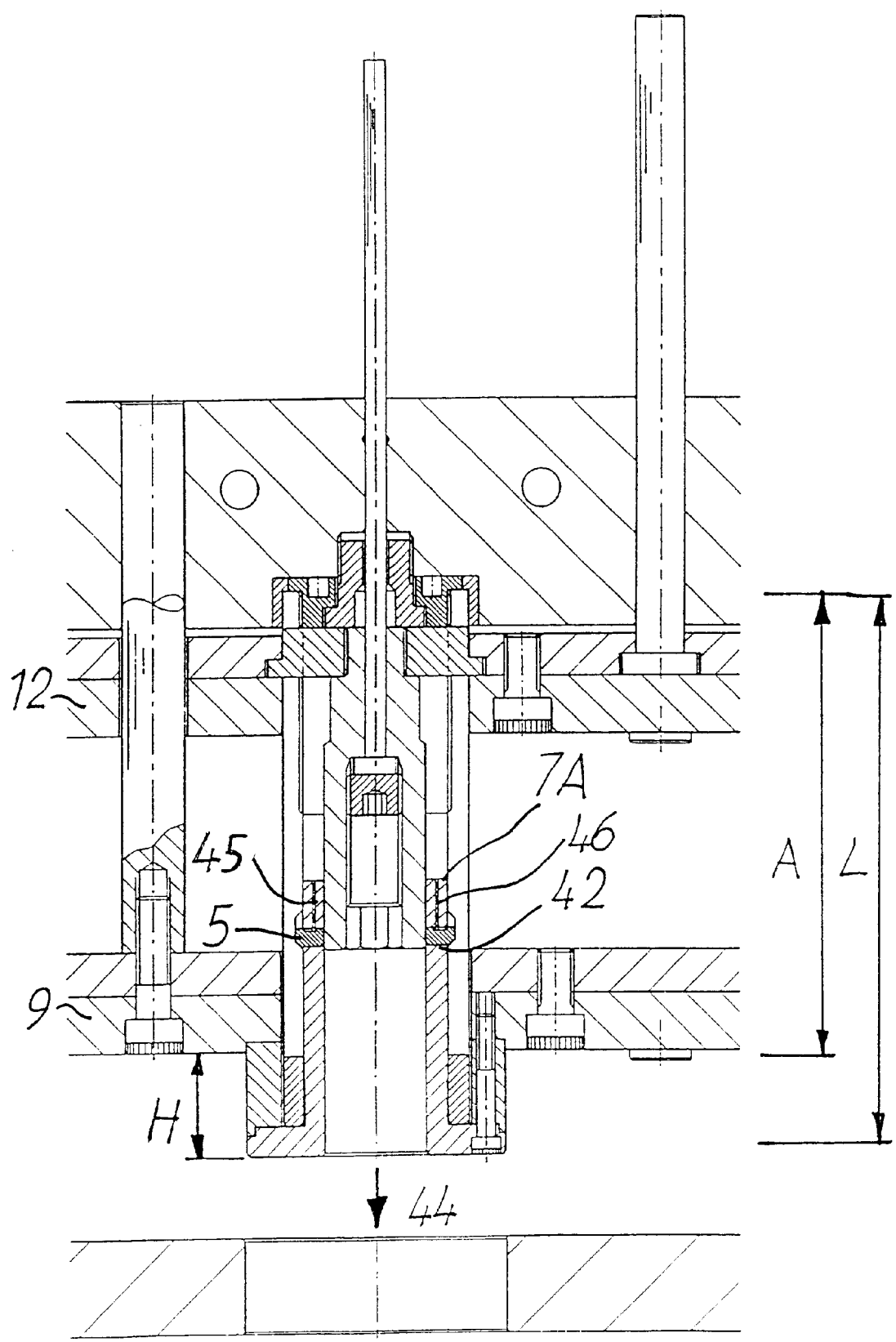
FIG. 5 shows the upper moving ejector plate displaced to an end position.

An arrangement 1 in accordance with the present invention for a two-stage ejector 2 in a moulding tool 3, which comprises an actuator part 7 capable of displacement in an axial direction 6 exhibiting connecting segments 5 capable of being caused to be displaced radially 4 and an attaching part 8 capable of detachable attachment to the aforementioned actuator part, has the attaching part 8 so arranged as to be in the form of a telescopic tube 8 for determining the length of stroke attached to the inside 50A of a front part 50 of the tool. The aforementioned connecting tube 8 exhibits pairs of slots 10, 11 facing away from one another along a part A of its length L.

An attachment part 13 capable of attachment to a moving front ejector plate 12 is accommodated in the aforementioned slots 10, 11, each of which has its own radially projecting part 14, 15, and is so arranged as to be capable of displacement together with the aforementioned attached ejector plate 12 in the longitudinal extent A of the slots. A moving ejector plate 9 situated at the rear is in turn attached to the actuating part 7.

The aforementioned actuating part 7 is accommodated in such a way that it is capable of displacement in the axial direction 6 in a hole 17 passing entirely through the frame 16 of the tool, and in the interior of which the rear part 18 of the aforementioned actuating part is accommodated in its entirety within the side 19 of the tool frame 16 facing away from the ejector plates 9, 12.

An arrangement 1 in accordance with the foregoing can be fixed in the centre of a tool, in conjunction with which it is also possible to cause a central ejector 20 to be attached thereto, or to arrange a two-stage ejector on either side in a mould.

It is possible to achieve an embodiment such as that described above by attaching the slotted tube 8 to the inside 50A of the front tool part 50. The connecting tube 8 is thus attached to the front tool part 9 by means of a screwed connection 22. In the illustrative example, the aforementioned screwed connection 22 can be formed by an end part 26 capable of being screwed internally into the connecting tube 8 and capable of being attached to its internal threads 23 with its external threads 25, which end part is capable of being screwed securely in place to the aforementioned tool part 50 by means of a threaded 28 part 29 capable of being screwed from the outside 27 of the machine, which part is screwed securely in place with its external threads 28 to internal threads 30 in a recess 31 in the tool part 50 matching the aforementioned part 29.

The part 29 exhibits an accommodating opening 43 for a hexagon socket and a transcurrent hole 32 for the central ejector 20, and it is possible by means of an extra-long hexagon socket (not shown in the illustration) to reach the part 39 and to screw it in or out respectively. The length A of the aforementioned tube 8 determines the length of stroke, No. I. The length of stroke is made shorter, for example, by shortening the tube 8.

The aforementioned connecting tube 8 is provided with a stop 33, which is formed by the bottom 10A, 11A of the aforementioned slots 10, 11. The aforementioned stop 33 is so arranged as to limit the displacement of the connecting tube 8 and the attachment part 13 relative to one another.

Internally 34 in the connecting tube 8 is an annular accommodating grove 35 for the purpose of accommodating the connecting segments 5 therein, and accommodated internally in the actuating part 7 is a piston 36 capable of axial 6 displacement, which is capable of attachment to the attachment part 13.

The aforementioned piston 36 and attachment part 13 are capable of being connected together with the help of threaded connections 37, 38 and with the help of a hexagon socket (not shown), which fits in an opening 39 at the back of the piston 36 and is adapted for a hexagon socket, the piston 36 can easily be screwed securely to and respectively released from the attachment part 13 that is capable of attachment to the moving ejector plate 12 from the outside 27 of the tool.

An aforementioned ejector 20 can be attached to the aforementioned piston 36 and is caused to move in time with the movement of the actuating part 7 and the piston 36.

The height H of the part 37, the rear part 40 of the actuating part 7, which is so arranged as to be accommodated with its main part outside the aforementioned rear mould plate 16, essentially corresponds to the thickness T of the rear mould plate 16.

The function of the invention is also that, when the connecting tube 8 comes up against the actuating part 7, the segments 5 are caused by a thickened stop part 41 in the piston 36 to be forced out radially 4 through accommodating openings 42 in the actuating part 7 and into the aforementioned accommodating groove 35 in the connecting tube 8 so that stroke number II starts. The first movement is thus locked until the radially extending attachment part 13 on its return stroke meets the actuating part 7 axially, and until the two plates 12, 9 are retracted in the direction of the arrow 44 to their starting positions.

In conjunction with dismantling the actuating part 7 or the piston 36, the aforementioned connecting segments 5 are prevented from falling out by pins 45, which are accommodated in the inner end 7A of the actuating part 7, are accommodated in a slot 46 on one side of the aforementioned connecting segments 5.

The above is a detailed description of the construction of such an arrangement and a brief description of its function.

The invention is not, of course, restricted to the embodiment described above and illustrated in the drawings. Modifications are possible, especially with regard to the nature of the various parts, or through the application of equivalent technology, without departing from the area of protection for the invention as defined in the Patent claims.

What is claimed is:

1. Arrangement (1) for a two-stage ejector (2) in a moulding tool (3), which comprises an actuator part (7) exhibiting connecting segments (5) capable of being caused to be displaced radially (4) and an attaching part capable of detachable connection to the aforementioned actuator part (7), characterized in that the attaching part is in the form of a telescopic tube (8) for determining the length of stroke attached to the inside (50A) of a front part (50) of the tool, in that the aforementioned connecting tube (8) exhibits pairs of slots (10, 11) along its length, in that an attachment part (13) capable of being attached to a moving front ejector plate (12) is accommodated in the aforementioned slots (10, 11) and is capable of displacement in the longitudinal extent (A) of the slots, in that a moving rear ejector plate (9) is attached to the actuating part (7), and in that the aforementioned actuating part (7) is accommodated in such a way that it is capable of displacement in a hole (17) passing entirely through the frame (16) of the tool, in the interior of which the rear part (18) of the aforementioned actuating part is accommodated in its entirety within the side (19) of the tool frame (16) facing away from the ejector plates (9, 12).

2. Arrangement in accordance with patent claim 1, characterized in that the connecting tube (8) is thus attached to an aforementioned front tool part (50) by means of a screwed connection (22).

3. Arrangement in accordance with patent claim 2, characterized in that the screwed connection (22) is formed by an end part (26) capable of being screwed internally (23) into the connecting tube (8) and capable of being screwed securely in place to the aforementioned tool part (50) by means of a threaded part capable of being screwed in place from the outside of the machine.

4. Arrangement in accordance with claim 1, characterized in that the connecting tube (8) is provided with a stop (33), which is so arranged as to limit the displacement of the connecting tube (8) and the attachment part (13) relative to one another.

5. Arrangement in accordance with patent claim 4, characterized in that the aforementioned stop (33) is formed by the bottom (10A, 11A) of the aforementioned slots (10, 11).

6. Arrangement in accordance with claim 1, characterized in that internally (34) in the connecting tube (8) is an annular accommodating groove (35) for the connecting segments (5).

7. Arrangement in accordance with claim 1, characterized in that accommodated internally in the actuating part (7) is a piston (36) capable of axial (6) displacement, which is capable of attachment to the attachment part (13).

8. Arrangement in accordance with patent claim 7, characterized in that the piston (36) and attachment part (13) are capable of being connected together with the help of threaded connections (37, 38).

9. Arrangement in accordance with patent claim 8, characterized in that an ejector (20) is attached to the aforementioned piston (36).

10. Arrangement in accordance with claim 1, characterized in that the height (H) of the rear part (40) of the actuating part, which is so arranged as to be accommodated outside the mould plate (16), essentially corresponds to the thickness (T) of the rear mould plate (16).

* * * * *